May 5, 1942.  F. A. GREEN  2,281,877
CUTTING STICK
Filed Oct. 21, 1940  2 Sheets-Sheet 1
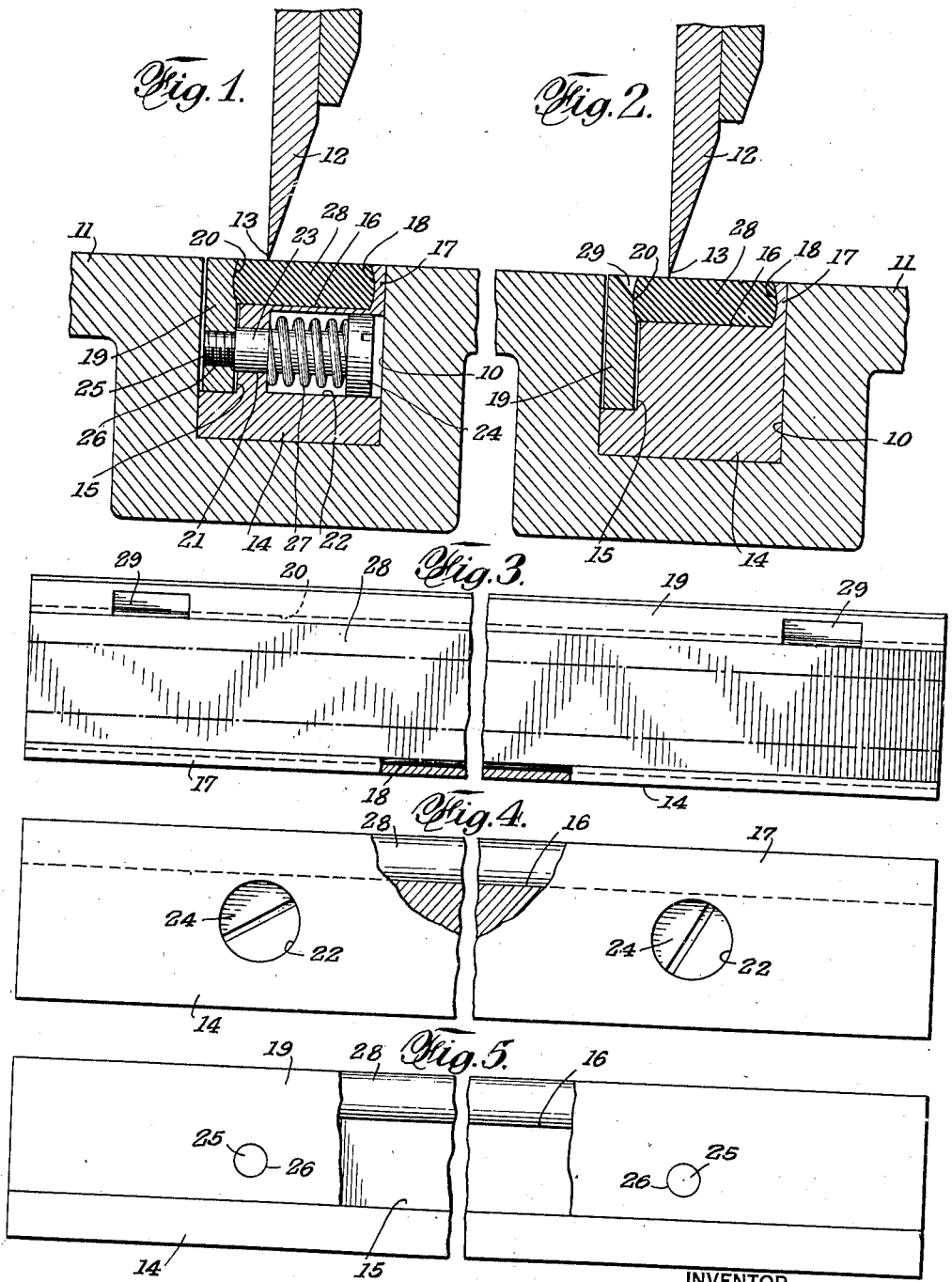
INVENTOR
FRANK A. GREEN
BY
Percy Freeman
ATTORNEY May 5, 1942.　　　　F. A. GREEN　　　　2,281,877
CUTTING STICK
Filed Oct. 21, 1940　　　　2 Sheets-Sheet 2
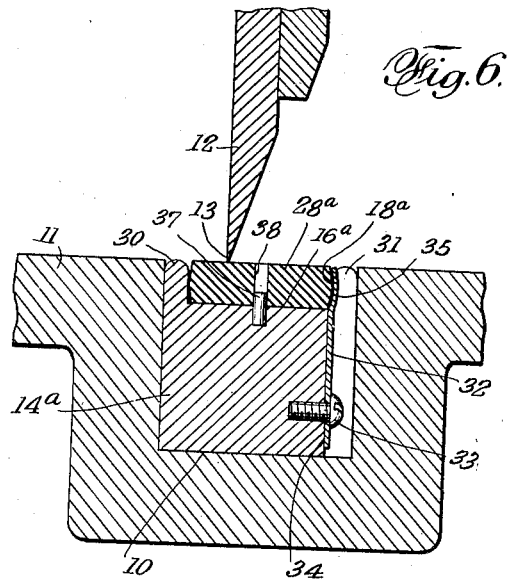
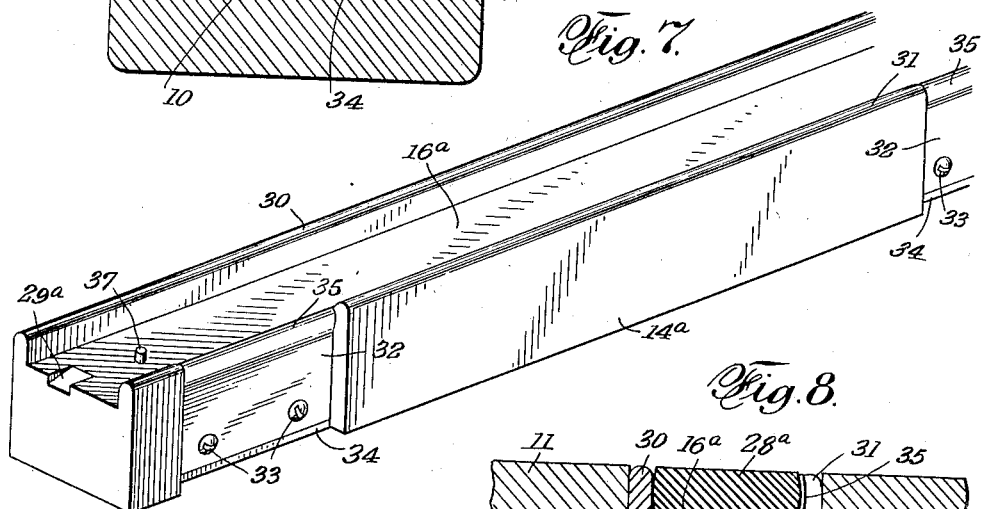
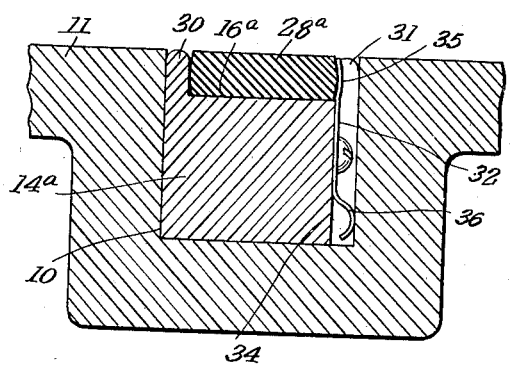
INVENTOR
FRANK A. GREEN
BY
ATTORNEY Patented May 5, 1942

2,281,877

UNITED STATES PATENT OFFICE 2,281,877

CUTTING STICK

Frank A. Green, Queens Village, N. Y.

Application October 21, 1940, Serial No. 362,003

3 Claims. (Cl. 164—58)

This invention relates to cutting sticks for use in conventional sheet cutting machines and for similar uses.

The conventional form of cutting stick comprising merely a length of wood having a square cross-section, has been found faulty in that it warped and frequently presented an abutment which caught the bottom sheets of a stack and interfered with sliding said stack into cutting position. These wooden sticks also deteriorate rapidly because of their fibrous structure. This latter fault may be overcome by making the sticks of artificial composition having non-fibrous structure, but these latter sticks will have faulty warp.

Other attempts to provide structures which obviate the above faults have been made with varying degrees of success. This invention, therefore, seeks to improve the structure of cutting sticks whereby long and economical life thereof may be had and whereby the faults enumerated above are eliminated.

The invention has for its primary object the provision of a cutting stick in which a non-metallic member is arranged to be reversed side for side and turned end for end to give a plurality of knife-edge engaging cutting surfaces or lines. In this manner, clean cutting by the knife may be had until all of the knife-engaging surfaces have been employed successively for cooperating with the knife to perform the cutting operation.

The invention further contemplates the provision of a cutting stick in which a composition member of a tough non-metallic material such as micarta or other phenolic material, may be variably positioned in relation to the cutter to provide a plurality of selective cutter engaging surfaces.

Another object is to provide a novel form of holder means for the non-metallic member whereby said member may be expeditiously positioned and held therein. The structural details of said holder means also form an important part of this invention.

With the foregoing and other objects, features, and advantages in mind, the invention may be better realized from the following detailed specification, which is based on the accompanying drawings, illustrating an exemplary embodiment of the invention.

In the drawings:

Fig. 1 is a vertical sectional view of a fragment of a cutting machine provided with a cutting stick according to the present invention.

Fig. 2 is a similar view at another line of section.

Fig. 3 is a plan view of the cutting stick, the middle portion being broken away.

Fig. 4 is a view of one side of the cutting stick shown in Fig. 3.

Fig. 5 is a view of the other side of said cutting stick.

Fig. 6 is a view similar to Fig. 1 and illustrates an alternate form of the invention.

Fig. 7 is a perspective view of one end of the cutting stick shown in Fig. 6.

Fig. 8 is a vertical sectional view showing a further modified form of the invention.

In that embodiment of the invention which is illustrated, the cutting stick is shown as being disposed within a slot 10 formed in the bed 11 of a cutting machine, said machine being provided with a cutter or knife 12. The machine is of conventional form with the vertical center line of the slot 10 displaced somewhat with respect to the knife edge 13.

In its present form, the cutting stick comprises a holder 14 provided with a rabbet 15 at one side thereof and with a seat 16 at the top thereof. At the other side and flanking the seat 16, the holder is provided with a retaining wall 17 formed with an inner concave face 18.

The rabbet 15 has disposed therein a clamp plate 19 having a portion in opposed relation to the retaining wall 17, said portion being also formed with an inner concave face 20. The depth of the rabbet 15 is preferably greater than the thickness of the clamp plate to permit limited lateral movement of said clamp plate.

The holder 14 is shown as having a plurality of horizontal bores 21 each having a co-axial counterbore 22. Slidably engaged in each bore, there is provided a shoulder screw 23 having a slotted head 24 disposed in the counterbore and provided with a threaded stud 25 engaged in screw seats 26 in the clamp plate 19. Engaged under the head 24 of each screw, and seated against the bottom of the counterbore, there is provided a compression spring 27.

From the above structure, it is apparent that the springs 27 seek to cause engagement of the clamp plate 19 with the lateral wall of the rabbet 15.

The seat 16 is adapted to receive a member 28 engaging its bottom surface, the top surface thereof being flush with the top surface of the bed 11. The member 28 is preferably in the form of a strip having its lateral edge convexly curved for confining fit with the concave faces 18 and 20. The width of the strip 28 is made somewhat greater than the smallest distance between said concave faces so that the springs 27 are tensioned when said strip is in position between the wall 17 and the clamp plate 19. Thus clamped, the strip is securely held for engagement by the knife edge 13 which contacts the upper surface thereof along a line nearer one of its convexly curved lateral edges. This manner of mounting the strip obviates warp thereof so that a smooth uninterrupted surface on the bed of the machine is provided.

As at present contemplated, the strip 28 is formed of a phenolic composition preferably micarta to provide a tough, long-wearing, non-fibrous member capable of withstanding many score inducing contacts with the knife edge 13.

However, long use would eventually score the surface engaged by the knife. In that event, the strip may be removed from its seat, turned end for end, and replaced to position an unscored portion of the surface of the strip beneath the knife. When one surface of the strip has been thus multilated along both knife-engaging lines, the strip may be reversed top for bottom and employed as above. Thus, four lines of contact may be selectively presented to the knife.

To facilitate removal of the strip from the holder, the clamp plate 19 may be provided with notches 29 so a sharp instrument may be inserted to pry up one lateral edge of the strip and thus free the strip from the holder. The strip is replaced by merely snapping it into position on its seat.

Another form of the invention is illustrated in Figs. 6 and 7. In this form the holder 14a is formed with a seat 16a between the walls 30 and 31. The non-metallic composition strip 28a is designed to rest upon the seat 16a and loosely fit between the walls 30 and 31.

In order to firmly position the strip in its seat, means such as the spring members 32 are provided. These latter members, preferably made of sheet spring material, are secured, as by screws 33, to recessed wall portions 34 formed in the holder 14a in such a manner as to cause the concavely curved portions 35 of said spring members to impinge against the cooperating edge 18a of the strip 28a. Thus the other edge of the strip is urged against the wall 30, the strip thereby being firmly held on its seat in the holder.

So as to obviate any tendency for the holder 14a to shift in the table groove 10, the spring member 32 may be provided with a portion 36 arranged to engage one of the side walls of the groove so as to urge the opposed face of the holder into firm contact with the other side wall of said groove. Fig. 8 shows this arrangement.

The cutter 12, as is usual, has imparted to it a slicing motion which might tend to cause endwise displacement of the strip 28a. A simple means for off-setting this is shown in Fig. 6 wherein the holder is provided with a pin 37 at one end thereof and centrally between the walls 30 and 31, said pin engaging into a hole 38 in the strip. This hole may be provided at both ends of the strip so that at least one engaged with the pin 37 for any position of the strip.

When it is desired to remove the strip from the holder, one end thereof may be lifted from its seat so that it may be grasped for complete removal. To facilitate this the holder may be notched as at 29a for the insertion of an instrument to initiate the removal process.

From the foregoing it is readily apparent that several forms of improved cutting stick have been provided in which the mentioned faults have been eliminated. While the invention has been described in considerable detail with respect to the illustrated forms thereof, it is not intended that the following claims be limited in scope by this specific disclosure but to include such other modifications as fall within the spirit of the invention.

What I claim as new and desire to secure by Letters Patent is:

1. A cutting stick comprising a holder having a seat and provided with a wall flanking one side of said seat, a non-metallic member positioned upon said seat, a clamp plate flanking the other side of said seat, and means for yieldingly urging said clamp plate to clamp said member against the mentioned wall, said means comprising a plurality of studs carried by said clamp plate and each formed with a head disposed in a bore formed in said holder, and a compression spring engaged between said head and the base of said bore.

2. In a cutting stick, a knife engaging member having oppositely curved lateral edges, and a holder for said member having a fixed wall curved to fit one of said lateral edges, said holder being provided with a yieldably mounted wall curved to fit the other of said lateral edges and arranged to yieldingly hold said member in place, a pin extending from said holder between the walls thereof and a recess adjacent each end of the knife-engaging member for keying with said pin to lock the member against endwise movement between said walls.

3. A cutting stick for reception in a groove of a bed of a cutting machine, said stick comprising a holder having a seat for supporting a knife-engaging member, a fixed wall at one side of said seat and means for holding said member in clamped position in said seat and for holding the holder in clamped position in said groove, said means comprising a plurality of spring members spaced along the length of the holder and secured thereto, one portion of said spring members having opposed lateral engagement with said non-metallic member and another portion of said spring members having engagement with the wall of said groove and means for locking the knife-engaging member against endwise movement on said seat, said means comprising a pin extending from the surface of said seat and a recess adjacent each end of the knife-engaging member for keying with said pin.

FRANK A. GREEN.